United States Patent [19]
Kim

[11] Patent Number: 5,799,890
[45] Date of Patent: Sep. 1, 1998

[54] ACTUATING SYSTEM FOR CHANGING A FISHING REEL FROM A RETRIEVE STATE INTO A CAST STATE

[75] Inventor: Hyunkyu Kim, Broken Arrow, Okla.

[73] Assignee: Brunswick Corporation, Tulsa, Okla.

[21] Appl. No.: 680,331

[22] Filed: Jul. 12, 1996

[51] Int. Cl.⁶ ............................................. A01K 89/00
[52] U.S. Cl. ............................................. 242/261
[58] Field of Search ........................... 242/261, 260, 242/259

[56] References Cited

U.S. PATENT DOCUMENTS

| | | |
|---|---|---|
| 4,142,694 | 3/1979 | Rankin, Jr. . |
| 4,666,101 | 5/1987 | Atobe ................................. 242/261 X |
| 4,901,944 | 2/1990 | Aoki ................................. 242/260 |
| 5,257,753 | 11/1993 | Sato . |
| 5,275,352 | 1/1994 | Sato . |
| 5,318,244 | 6/1994 | Morimoto . |
| 5,320,302 | 6/1994 | Morimoto ........................... 242/261 |
| 5,340,053 | 8/1994 | Morimoto ........................... 242/261 |
| 5,601,246 | 2/1997 | Takahashi ........................... 242/261 |

*Primary Examiner*—Donald P. Walsh
*Assistant Examiner*—Emmanuel M. Marcelo
*Attorney, Agent, or Firm*—Wood, Phillips, VanSanten, Clark & Mortimer

[57] ABSTRACT

A fishing reel having a frame with first and second laterally spaced parts with a line storage space therebetween, and an operating mechanism on the frame. The operating mechanism includes a rotatable line carrying spool, a rotatable crank element, and a drive connection between the crank element and spool. The drive connection includes a first element that is selectively repositionable between a) an engaged position wherein the operating mechanism is in a retrieve state in which the drive connection transmits a rotative force from the crank element through the drive connection to the spool and b) a disengaged position wherein the drive connection is disengaged and the operating mechanism is in a cast state in which the spool is freely rotatable to allow line to pay off of the spool. The operating mechanism may further include a cam element on one of the frame parts that is repositionable relative to one frame part from a first position into a second position as an incident of which the cam element causes the first element to move from the engaged position to the disengaged position. The operating mechanism may further include an actuator mounted to the frame for guided movement relative to the frame from a first position into a second position. The operating mechanism may further include first structure between the cam element and actuator for causing the cam element to move from its first position into its second position as an incident of the actuator moving from its first position into its second position, whereupon the operating mechanism is changed from the retrieve state into the cast state. The first cooperating structure connects the cam element substantially fixedly to the actuator.

16 Claims, 4 Drawing Sheets

5,799,890

ACTUATING SYSTEM FOR CHANGING A FISHING REEL FROM A RETRIEVE STATE INTO A CAST STATE

BACKGROUND OF THE INVENTION

1. Field of the Invention

This invention relates to fishing reels and, more particularly, to an actuating system for changing the fishing reel from a retrieve state into a cast state.

2. Background Art

A typical bait cast fishing reel includes a spool which is rotatable to retrieve line onto the fishing reel. A crank handle imparts rotation to the spool through a drive connection with the fishing reel in a retrieve state. By operating an actuator, the user disengages the drive connection to place the fishing reel in a cast state.

A common actuating system utilizes a repositionable actuator that spans laterally spaced frame parts bounding a line storage space. The actuator is designed to be repositioned by the thumb on the user's hand that is holding a rod upon which the reel is mounted.

An exemplary thumb-operable actuator is shown in U.S. Pat. No. 4,142,694, to Rankin, Jr. Rankin, Jr. has a thumb button with two laterally oppositely projecting posts which project into laterally spaced frame parts and guide pivoting movement of the actuator through its range of motion. The actuator in Rankin, Jr. appears to be shiftable in laterally opposite directions and as such would be prone to binding with the frame parts in use. This is undesirable in that frictional forces may develop between the actuator and frame that inhibit free movement of the thumb button. This may also account for excessive wearing of parts on the fishing reel.

SUMMARY OF THE INVENTION

In one form of the invention, a fishing reel is provided having a frame with first and second laterally spaced parts with a line storage space therebetween, and an operating mechanism on the frame. The operating mechanism includes a rotatable line carrying spool, a rotatable crank element, and a drive connection between the crank element and spool. The drive connection includes a first element that is selectively repositionable between a) an engaged position wherein the operating mechanism is in a retrieve state in which the drive connection transmits a rotative force from the crank element through the drive connection to the spool and b) a disengaged position wherein the drive connection is disengaged and the operating mechanism is in a cast state in which the spool is freely rotatable to allow line to pay off of the spool. The operating mechanism may further include a cam element on one of the frame parts that is repositionable relative to one frame part from a first position into a second position as an incident of which the cam element causes the first element to move from the engaged position to the disengaged position. The operating mechanism may further include an actuator mounted to the frame for guided movement relative to the frame from a first position into a second position. The operating mechanism may further include first structure cooperating between the cam element and actuator for causing the cam element to move from its first position into its second position as an incident of the actuator moving from its first position into its second position, whereupon the operating mechanism is changed from the retrieve state into the cast state. The first cooperating structure connects the cam element substantially fixedly to the actuator.

In one form, the one frame part has laterally spaced sides, the cam element has a body with a substantially flat portion on one laterally spaced side of the one frame part and an arm projecting from the flat portion of the cam element body through the one frame part and engaging the actuator between the first and second frame parts.

In one form, the flat portion of the cam element body has first and second oppositely facing, substantially parallel, flat surfaces and the arm on the cam element body projects substantially at a right angle to the first and second flat surfaces on the flat portion of the cam element body. The flat portion of the cam element body and the arm on the cam element may be formed as one piece.

In one form, the flat portion of the cam element body has a slot therein, with there being a post assembly on the one frame part that projects into the slot and captively maintains the flat portion of the cam element body adjacent to the one frame part. The slot in the flat portion of the cam element body is elongate so that the post assembly moves within the slot to guide movement of the cam element between its first and second positions.

In one form, the actuator has spaced ends which are connected one each to the first and second frame parts and there is a fastener that extends through the cam element body into one of the ends of the actuator.

A spacer element, separate from the frame and actuator, can be provided to act between the other end of the actuator and the other of the first and second frame parts to maintain a predetermined space between the other end of the actuator and the other of the first and second frame parts.

In one form, the one frame part has an elongate slot therethrough and the cam element has an arm projecting from the flat portion of the body through the elongate slot in the one frame part and moves guidingly within the slot in the one frame part as the actuator moves between its first and second positions.

The structure for connecting the cam element to the actuator may include a fastener that extends through the slot in the one frame part and into the actuator.

In another form of the invention, a fishing reel is provided having a frame with first and second laterally spaced parts with a line storage space therebetween, and an operating mechanism on the frame. The operating mechanism includes a rotatable line carrying spool, a rotatable crank element, and a drive connection between the crank element and spool. The drive connection includes a first element that is selectively repositionable between a) an engaged position wherein the operating mechanism is in a retrieve state in which the drive connection transmits a rotative force from the crank element through the drive connection to the spool and b) a disengaged position wherein the drive connection is disengaged and the operating mechanism is in a cast state in which the spool is freely rotatable to allow line to pay off of the spool. The operating mechanism may further include a cam element on one of the frame parts that is repositionable relative to the one frame part from a first position into a second position as an incident of which the cam element causes the first element to move from the engaged position to the disengaged position. The operating mechanism may further include an actuator mounted to the frame for guided movement relative to the frame from a first position into a second position. The operating mechanism may further include first structure cooperating between the cam element and actuator for causing the cam element to move from its first position into its second position as an incident of the actuator moving from its first position into its second position, whereupon the operating mechanism is changed from the retrieve state into the cast state. The one frame part has laterally opposite sides. The cam element has a body on one lateral side of the one frame part and an arm in fixed relationship to the cam element body that projects through the one frame part.

DETAILED DESCRIPTION OF THE DRAWINGS

Figure 1:
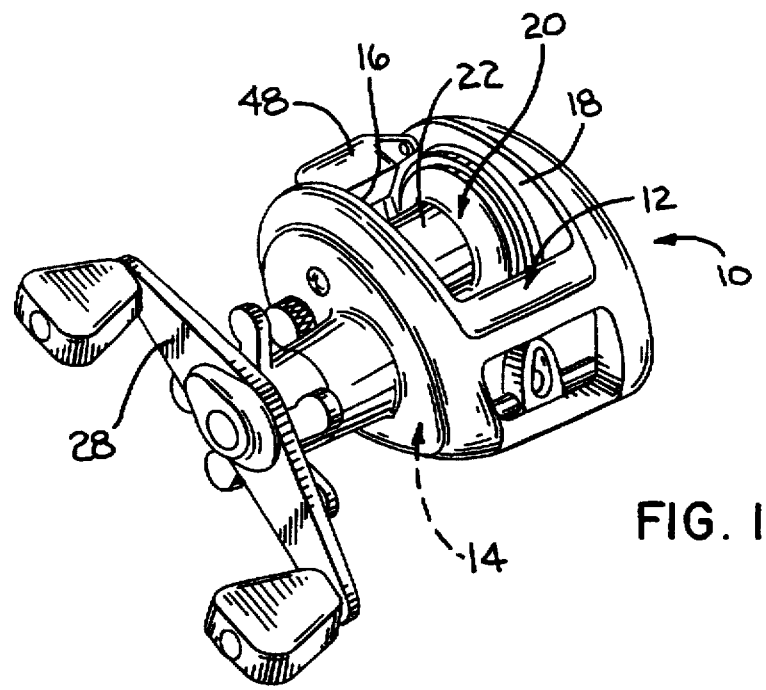
FIG. 1 is a front perspective view of a fishing reel having an actuator system for changing the reel from a retrieve state into a cast state, according to the present invention.
Figure 2:
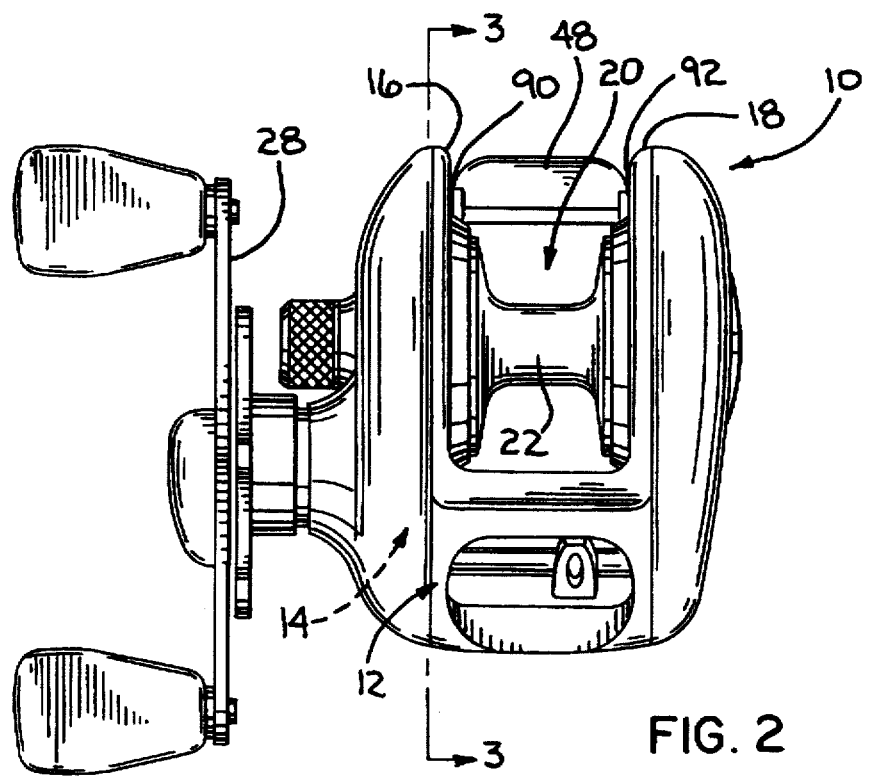
FIG. 2 is an enlarged, plan view of the fishing reel in FIG. 1.

A bait cast fishing reel, of the type suitable for incorporation of the present invention, is shown at 10 in the drawings. The fishing reel 10 has a frame 12 upon which the various components of the reel operating mechanism 14 are mounted. The frame 12 includes first and second laterally spaced frame parts 16, 18, which bound a line storage space 20. Line is retrieved within the space 20 on a spool 22 which has a central shaft 24. The shaft 24 extends across and through the frame parts 16, 18 and is supported thereon for rotation about a laterally extending axis 26.

The spool 22 is rotatable through a crank handle 28 which rotates a crank shaft 30. Through a conventional type of drive train/drive connection at 32, the crank shaft 30 imparts rotation to a drive gear 34 which is in mesh with a first drive element 36 on the spool shaft end 38.

Figure 4:
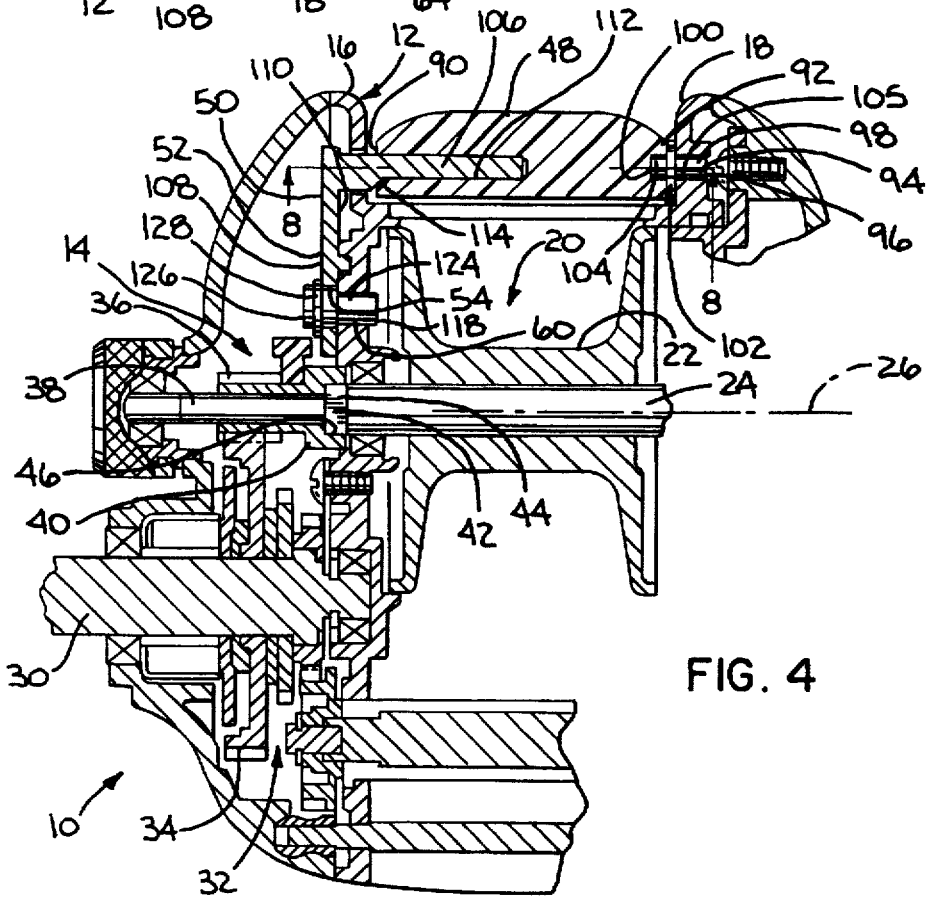
FIG. 4 is an enlarged, fragmentary, cross-sectional view of the fishing reel taken along line 4—4 of FIG. 3 with the fishing reel in a retrieve state.

With the reel 10 in a retrieve state, as shown in FIG. 4, a cup-shaped keying portion 40 on the first element 36 assumes an engaged position wherein it laterally overlaps a key part 42 of the spool shaft 24. With the keying part 40 and key part 42 in laterally overlapping relationship, relative rotation between the spool shaft 24 and first drive element 36 is prevented. This keyed connection can be made by providing splines and/or one or more flats 44 on the key part 42, with the cooperating, inside surface 46 of the first drive element 36 having a complementary shape. With this arrangement, the drive force imparted by the drive gear 34 to the first drive element 36 is positively transmitted to the spool shaft 24 and thus the spool 22, keyed thereto.

Figure 5:
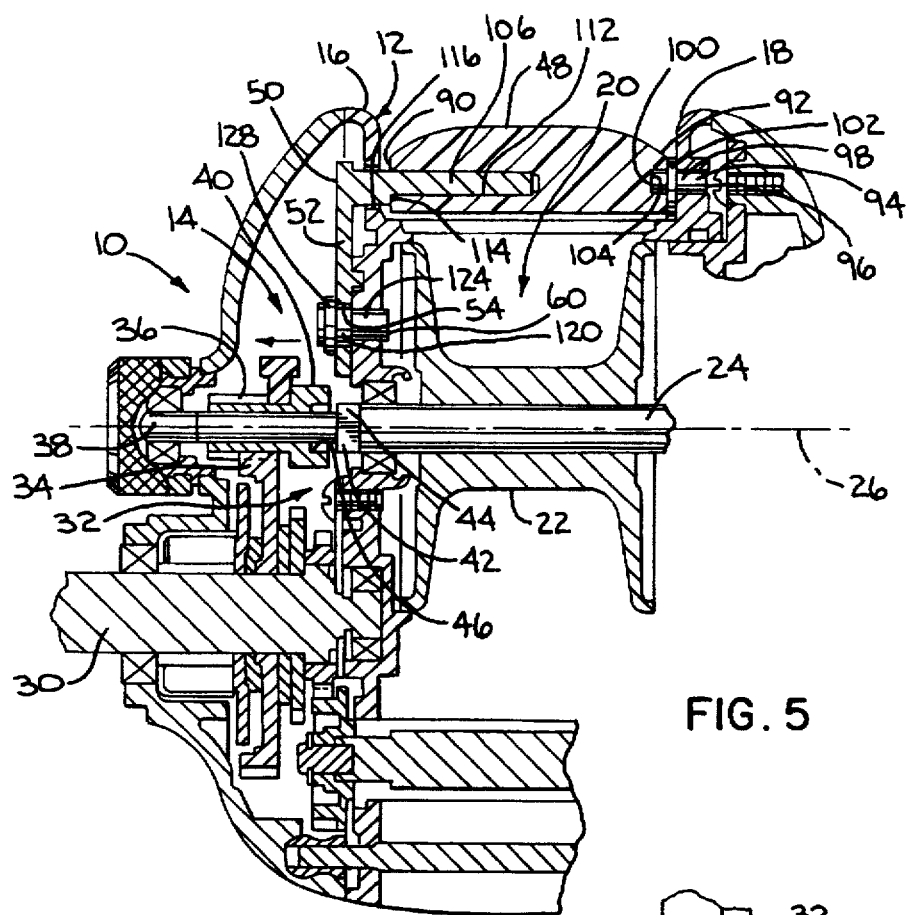
FIG. 5 is a view as in FIG. 4 with the fishing reel in a cast state.
Figure 6:
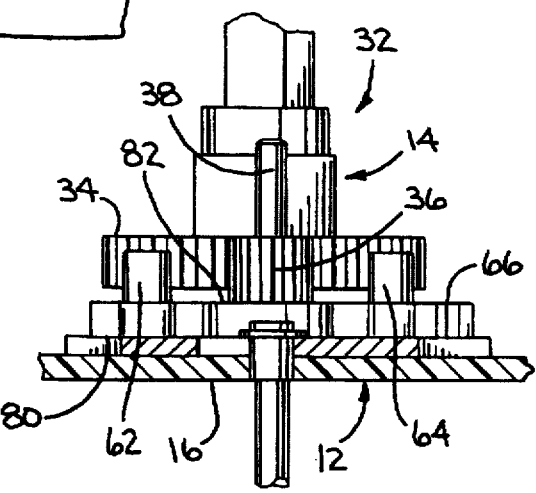
FIG. 6 is an enlarged, cross-sectional view of a portion of a drive connection between a crank handle and a line carrying spool, and showing a first repositionable element in an engaged position with the reel in the retrieve state, taken along line 6—6 of FIG. 3.
Figure 7:
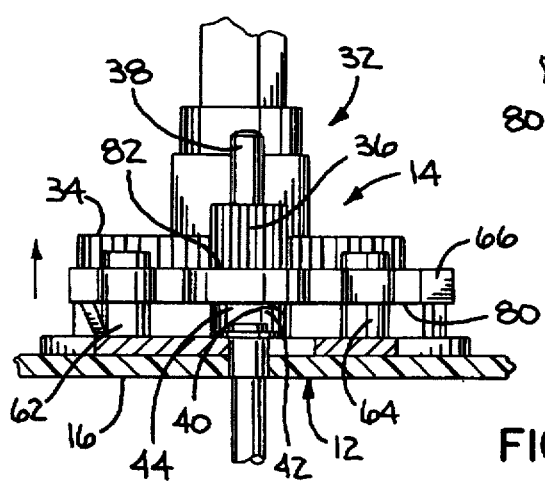
FIG. 7 is a view as in FIG. 6 with the first element repositioned to a disengaged position with the reel in the cast state.
Figure 10:
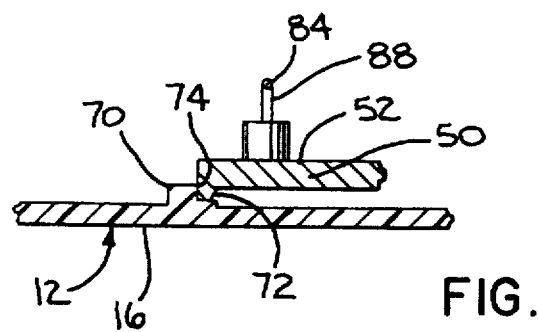
FIG. 10 is an enlarged, cross-sectional view of a cam element that is repositionable to change the reel from the retrieve state to the cast state, taken along line 10—10 of FIG. 3.
Figure 8:
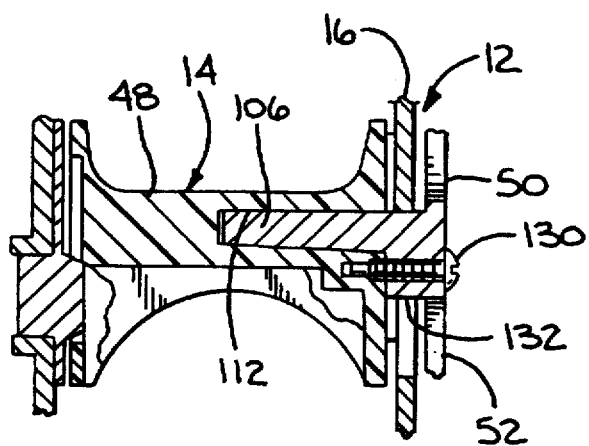
FIG. 8 is an enlarged cross-sectional view of an actuating assembly with an actuator thereon in a first position corresponding to the retrieve state for the reel.
Figure 9:
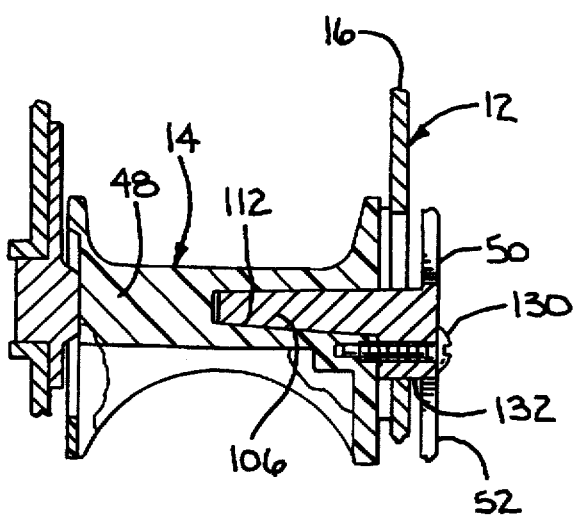
FIG. 9 is a view as in FIG. 8 with the actuator in a second position corresponding to the cast state for the reel.

When it is desired to change the fishing reel 10 from the retrieve state into a cast state, an actuator 48 is operated. The actuator 48 is manually movable by an operator from a first position, shown in FIG. 8, into a second position, shown in FIG. 9, to change the reel from the retrieve state into the cast state. The actuator 48 is operatively connected to a Y-shaped cam element 50. The cam element 50 has a substantially flat body 52. The body 52 has three elongate slots 54, 56, 58 therethrough. The slot 54 accommodates a mounting post assembly 60 that maintains the cam element body 52 captively adjacent to the frame part 16, as described in greater detail hereafter. The slots 56, 58 accommodate laterally projecting guide posts 62, 64 for a slide bar 66 which is responsible for shifting the first drive element 36 between the engaged position of FIG. 4 and a disengaged position in FIG. 5.

Figure 3:
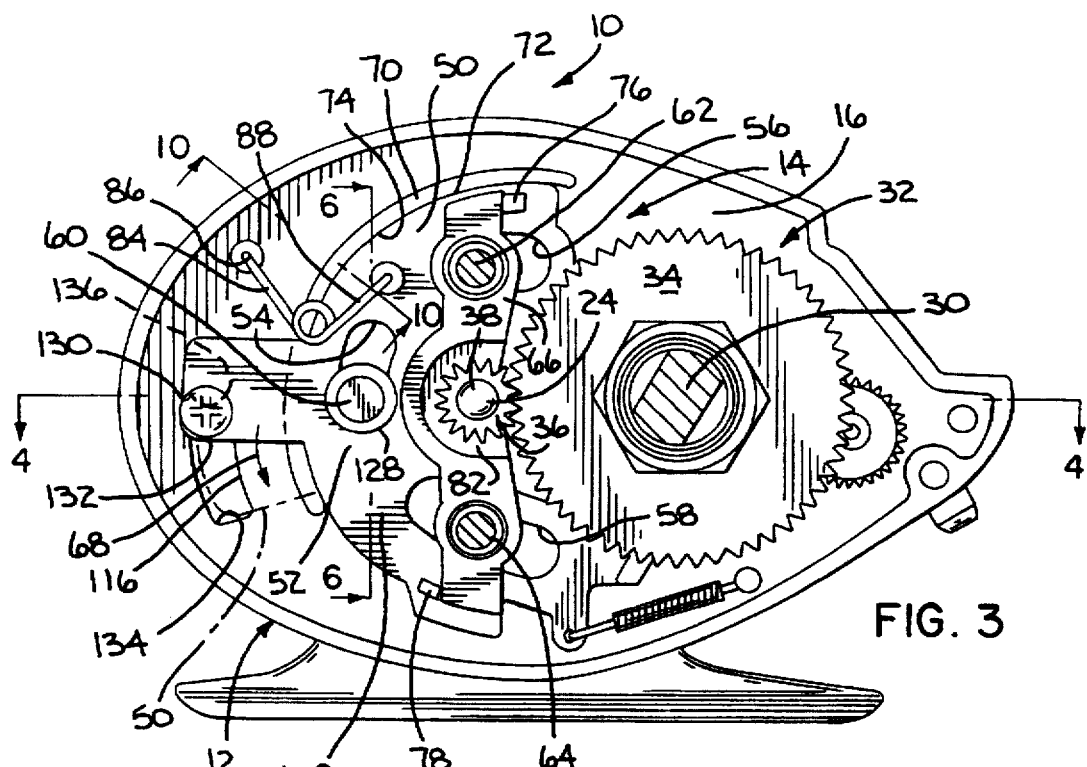
FIG. 3 is an enlarged, cross-sectional view of the fishing reel taken along line 3—3 of FIG. 2.

As the actuator 48 is moved from its first position into its second position, the cam element 50 pivots in the direction of the arrow 68 in FIG. 3 and is guided in this pivoting movement through a curved rail 70. An offset flange 72 on the body 52 conforms to the curvature of the rail 70 and is guided along the confronting surface 74 thereon as the cam element 50 moves between a solid line first position and a phantom line second position in FIG. 3, in response to the actuator 48 moving from its first position into its second position. As this occurs, cam surfaces 76, 78, in diametrically opposite locations relative to the shaft axis 26, bear upon the inwardly facing surface 80 of the slide bar 66, thereby progressively urging the slide bar 66 laterally away from the frame 16. The slide bar has a surface 82 which bears against the first drive element 36 and effects a corresponding lateral shifting of the drive element 36, thereby causing the cam element to move from the engaged position into the disengaged position, thereby changing the reel from the retrieve state into the cast state.

Through a conventional latch mechanism (not shown), the reel 10 is maintained in the cast state. The reel 10 is changed from the cast state into the retrieve state by simply rotating the crank handle 28, which thereby releases the latch mechanism. As this occurs, a formed wire spring 84 with spaced ends 86, 88, connected respectively to the cam element 50 and frame part 16, biasably urges the cam element 50 from its second position into its first position, and as an incident thereof the actuator 48 from its second position back into its first position.

The actuator 48 has laterally spaced ends 90, 92. A spacer element 94 acts between the one actuator end 92 and the frame part 18 to maintain the actuator end 92 consistently in a desired lateral relationship with the frame part 18. More particularly, the spacer element 94 has a cylindrical body 96 with a reduced diameter portion 98, large diameter portion 100, and a radially enlarged flange 102 therebetween. The large diameter portion 100 seats in a blind bore 104 in the actuator 48. The reduced diameter portion 98 projects into a cylindrical receptacle 105 on the frame part 18 so that the flange 102 resides between the actuator end 92 and the frame 18 to prevent contact therebetween. A positive spacing, no less than the axial thickness of the flange 102, is at all times maintained between the actuator end 92 and the frame part 18.

The opposite end 90 of the actuator 48 is mounted to the frame part 16 through a cantilevered arm 106 that projects substantially orthogonally to oppositely facing flat surfaces 108, 110 on the cam element body 52. The arm 106 is preferably formed as one piece with the body 52 and, with the cam element 50 in its operative position, projects into a blind bore 112 in the actuator 48. The arm 106 has a laterally facing shoulder 114 which abuts to the actuator end 92 to consistently place the arm 106 and actuator 48 in a desired lateral relationship.

With this arrangement, no part of the actuator end 90 projects into the frame part 16. Instead, the arm 106 extends continuously from the cam element body 50 through a slot 116 in the frame part 16 and into the actuator 48 in the space between the frame parts 16, 18, thereby spanning the space between the frame part 16 and the actuator end 90.

The desired spacing between the actuator end 90 and the frame part 16 is maintained by fixing the lateral location of the cam element body 52. This is accomplished through the mounting post assembly 60. The mounting post assembly 60 has a stepped, cylindrical body 118 with an intermediate portion 120 that is received in the slot 54 in the cam element body 52. One portion 124, spaced axially in one direction from the intermediate portion 120, is anchored in the frame part 16. A second portion 126, spaced axially in the opposite direction from the intermediate portion 120, has a radial enlargement 128 thereon which bears against the cam element surface 108 to captively maintain the cam element body 52 adjacent to the frame part 16. The cam element body 52 is not allowed to shift laterally outwardly to an extent that would allow the actuator end 90 to abut to the frame part 16. As a consequence, the actuator 48 is mounted to the frame 12 so that it is positively prevented from contacting either frame part 16, 18, regardless of the lateral force that might be inadvertently applied to the actuator 48 by the user.

At the same time, the direct fixed connection between the actuator 48 and cam element 50 assures a positive transmission of the actuating force from the actuator 48 to the cam element 50. In a preferred form, a screw 130 is directed through the cam element body 50 through the slot 116 and into the actuator end 90. The cam element 50 has a thickened portion 132 to accommodate the screw 130. The thickened portion 132 and the arm 106 are guided in the slot 116, and can be configured to abut the ends 134, 136 of the slot 116 to limit the range of travel for the actuator 48 and thus the cam element 50 between their first and second positions.

The foregoing disclosure of the specific embodiments is intended to be illustrative of the broad concepts comprehended by the invention.

I claim:

1. A fishing reel comprising:

a frame having first and second laterally spaced parts with a line storage space therebetween; and an operating mechanism on the frame, said operating mechanism including a rotatable line carrying spool, a rotatable crank element, and a drive connection between the crank element and spool, said drive connection including a first element that is selectively laterally repositionable relative to the frame between a) an engaged position wherein the operating mechanism is in a retrieve state in which the drive connection transmits a rotative force from the crank element through the drive connection to the spool and b) a disengaged position wherein the drive connection is disengaged and the reel operating mechanism is in a cast state in which the spool is freely rotatable to allow line to pay off of the spool, said operating mechanism further comprising a cam element with a cam surface on one of the frame parts that is repositionable relative to the one frame part from a first position into a second position as an incident of which the cam surface on the cam element produces a lateral camming force that causes the first element to move from the engaged position to the disengaged position, said operating mechanism further comprising an actuator mounted to the frame for guided movement relative to the frame from a first position into a second position, said operating mechanism further comprising first means cooperating between the cam element and actuator for causing the cam element to move from its first position into its second position as an incident of the actuator moving from its first position into its second position whereupon the operating mechanism is changed from the retrieve state into the cast state, said first cooperating means comprising means for connecting a part of the cam element substantially fixedly to the actuator, the cam surface and the part of the cam element moving as one piece as the cam element is repositioned relative to the frame, wherein the one frame part has laterally spaced sides, the cam element has a body with a substantially flat portion on one laterally spaced side of the one frame part and the part of the cam element comprises an arm projecting from the flat portion of the cam element body through the one frame part and engaging the actuator between the first and second frame parts, wherein the actuator has spaced ends which are connected one each to the first and second frame parts, one of the spaced ends has a laterally facing surface, the arm has a laterally facing surface that abuts to the laterally facing surface of the one of the spaced ends and there is a fastener that is separable from the arm and extends through the cam element body and through each of the laterally facing surface on the one of the spaced ends and the laterally facing arm surface into the one of the spaced ends of the actuator.

2. The fishing reel according to claim 1 wherein there is a spacer element separate from the frame and actuator that acts between the other end of the actuator and the other of the first and second frame parts to maintain a predetermined lateral space between the other end of the actuator and the other of the first and second frame parts.

3. The fishing reel according to claim 2 wherein the one frame part has an elongate slot therein, the cam element has an arm projecting from the flat portion of the cam element body through the elongate slot in the one frame part and moves guidingly within the slot in the one frame part as the actuator moves between its first and second positions.

4. The fishing reel according to claim 3 wherein the means for connecting the cam element to the actuator comprises a fastener that extends through the elongate slot in the one frame part and into the actuator.

5. The fishing reel according to claim 2 wherein the spacer element has a flange with laterally oppositely facing spacing surfaces residing between the other end of the actuator and the other of the first and second frame parts, the flange having a thickness between the laterally oppositely facing spacing surfaces which establishes a minimum spacing between the other end of the actuator and the other of the first and second frame parts.

6. A fishing reel comprising:

a frame having first and second laterally spaced parts with a line storage space therebetween; and an operating mechanism on the frame, said operating mechanism including a rotatable line carrying spool, a rotatable crank element, and a drive connection between the crank element and spool, said drive connection including a first element that is selectively repositionable between a) an engaged position wherein the reel operating mechanism is in a retrieve state in which the drive connection transmits a rotative force from the crank element through the drive connection to the spool and b) a disengaged position wherein the drive connection is disengaged and the reel operating mechanism is in a cast state in which the spool is freely rotatable to allow line to pay off of the spool, said operating mechanism further comprising a cam element on one of the frame parts that is repositionable relative to the one frame part from a first position into a second position as an incident of which the cam element causes the first element to move from the engaged position to the disengaged position, said operating mechanism further comprising an actuator with laterally spaced ends and mounted to the frame for guided movement relative to the frame from a first position into a second position, said operating mechanism further comprising first means cooperating between the cam element and actuator for causing the cam element to move from its first position into its second position as an incident of the actuator moving from its first position into its second position whereupon the operating mechanism is changed from the retrieve state into the cast state, said one frame part having laterally opposite sides, said cam element comprising a body on one lateral side of the frame part and an arm in fixed relationship to the cam element body that projects through the one frame part and is connected to one of the spaced ends of the actuator, said operating mechanism further comprising a spacer element separate from the frame and actuator and having a flange with laterally oppositely facing spacing surfaces that reside between the other of the spaced ends of the actuator and the other of the frame parts, the flange having a thickness between the laterally oppositely facing spacing surfaces that establishes a minimum spacing between the other of the spaced ends of the actuator and the other of the frame parts.

7. The fishing reel according to claim 6 wherein the arm on the cam element engages the actuator between the first and second frame parts.

8. The fishing reel according to claim 7 wherein the cam element body and arm are formed as one piece.

9. The fishing reel according to claim 6 wherein the spool is mounted on a shaft and the cam element body has a curved portion that extends at least partially around the spool shaft.

10. The fishing reel according to claim 6 wherein the cam element body has a substantially flat portion and there is a post assembly on the frame part that projects through the flat portion of the cam element body and a fixed laterally facing surface on the post assembly that faces the cam element and maintains the flat portion of the cam element body captively adjacent the one frame part.

11. The fishing reel according to claim 10 wherein the cam element body has an elongate slot through which the post assembly projects, said post assembly moving within the elongate slot to guide movement of the cam element between its first and second positions.

12. The fishing reel according to claim 6 wherein the actuator has first and second laterally spaced ends and including means for fixedly connecting the cam element to one end of the actuator.

13. The fishing reel according to claim 12 wherein the means for fixedly connecting the cam element to the actuator comprises a fastener extending fully through the one frame part.

14. The fishing reel according to claim 12 wherein the cam element has a shoulder that abuts to the one end of the actuator to maintain a space between the one end of the actuator and the one frame part.

15. The fishing reel according to claim 14 wherein the cam element arm projects across the space between the one end of the actuator and the one frame part.

16. The fishing reel according to claim 15 wherein there is no part of the actuator that projects through the one frame part.

* * * * *